US010935289B2

(12) United States Patent
Feldkeller et al.

(10) Patent No.: US 10,935,289 B2
(45) Date of Patent: Mar. 2, 2021

(54) HEAT EXCHANGER OR CHILLER

(71) Applicant: Mahle International GmbH, Stuttgart (DE)

(72) Inventors: Timo Feldkeller, Asperg (DE); Markus Wesner, Stuttgart (DE)

(73) Assignee: Mahle International GmbH

( * ) Notice: Subject to any disclaimer, the term of this patent is extended or adjusted under 35 U.S.C. 154(b) by 471 days.

(21) Appl. No.: 15/563,556

(22) PCT Filed: Mar. 31, 2016

(86) PCT No.: PCT/EP2016/057006
§ 371 (c)(1),
(2) Date: Feb. 26, 2018

(87) PCT Pub. No.: WO2016/156458
PCT Pub. Date: Oct. 6, 2016

(65) Prior Publication Data
US 2018/0172328 A1 Jun. 21, 2018

(30) Foreign Application Priority Data
Apr. 1, 2015 (DE) .................... 10 2015 205 933.2

(51) Int. Cl.
F25B 41/06 (2006.01)
F25B 43/00 (2006.01)
F28F 19/01 (2006.01)
F28F 27/02 (2006.01)
F25B 39/02 (2006.01)
F25B 39/00 (2006.01)

(52) U.S. Cl.
CPC ............ *F25B 41/062* (2013.01); *F25B 39/00* (2013.01); *F25B 39/02* (2013.01); *F25B 43/003* (2013.01);
(Continued)

(58) Field of Classification Search
CPC ........ F25B 41/062; F25B 39/00; F25B 39/02; F25B 43/003; F25B 2341/065;
(Continued)

(56) References Cited

U.S. PATENT DOCUMENTS 3,592,018 A * 7/1971 Widdowson ....... B60H 1/00485
62/222
4,149,390 A * 4/1979 Iijima ..................... F25B 39/02
165/176
(Continued)

FOREIGN PATENT DOCUMENTS

DE  102010055613 A1  6/2012
DE  102011008653 A1  7/2012
(Continued)

OTHER PUBLICATIONS

English abstract for DE-102010055613.
English abstract for DE-112013002728.

*Primary Examiner* — Cassey D Bauer
(74) *Attorney, Agent, or Firm* — Fishman Stewart PLLC

(57) ABSTRACT

A heat exchanger or chiller may include a heat exchanger block having a first fluid channel for a coolant and a second fluid channel for a refrigerant, an expansion valve for controlling a mass flow rate of the refrigerant, and a connection flange having an inlet channel and an outlet channel for the refrigerant. The expansion valve may be designed as an electronic expansion valve. The inlet channel may be connected to the second fluid channel in a transition region of the inlet channel. The connection flange may have an insertion opening, which may communicate with the transition region of the inlet channel, and into which the expansion valve may be inserted such that the expansion valve may control the mass flow rate of the refrigerant in the (Continued)

transition region and evaporation of the refrigerant may first occur in the second fluid channel.

15 Claims, 1 Drawing Sheet

(52) U.S. Cl.
CPC .............. *F28F 19/01* (2013.01); *F28F 27/02* (2013.01); *F25B 2341/065* (2013.01); *Y02B 30/70* (2013.01)

(58) Field of Classification Search
CPC ....... F25B 2500/18; F28F 19/01; F28F 27/02; Y02B 30/72
See application file for complete search history.

(56) References Cited

U.S. PATENT DOCUMENTS

| | | | |
|---|---|---|---|
| 6,814,133 B2 * | 11/2004 | Yamaguchi | F28D 9/0012 123/196 A |
| 9,121,643 B2 | 9/2015 | Schaefer et al. | |
| 9,605,883 B2 | 3/2017 | Katoh et al. | |
| 2009/0249810 A1 * | 10/2009 | Neumeister | F25B 39/022 62/239 |
| 2011/0239697 A1 * | 10/2011 | Styles | F25B 39/022 62/524 |
| 2013/0042643 A1 * | 2/2013 | Haussmann | F25B 41/062 62/299 |
| 2013/0061630 A1 * | 3/2013 | Schaefer | F25B 39/022 62/502 |
| 2014/0013787 A1 | 1/2014 | Wesner et al. | |
| 2016/0146520 A1 * | 5/2016 | Goel | F25B 41/062 62/115 |

FOREIGN PATENT DOCUMENTS

| | | |
|---|---|---|
| DE | 102011081886 A1 | 2/2013 |
| DE | 112012005079 T5 | 9/2014 |
| DE | 112013002728 T5 | 3/2015 |
| EP | 2174810 A2 | 4/2010 |
| WO | WO-2014048219 A1 | 4/2014 |

* cited by examiner

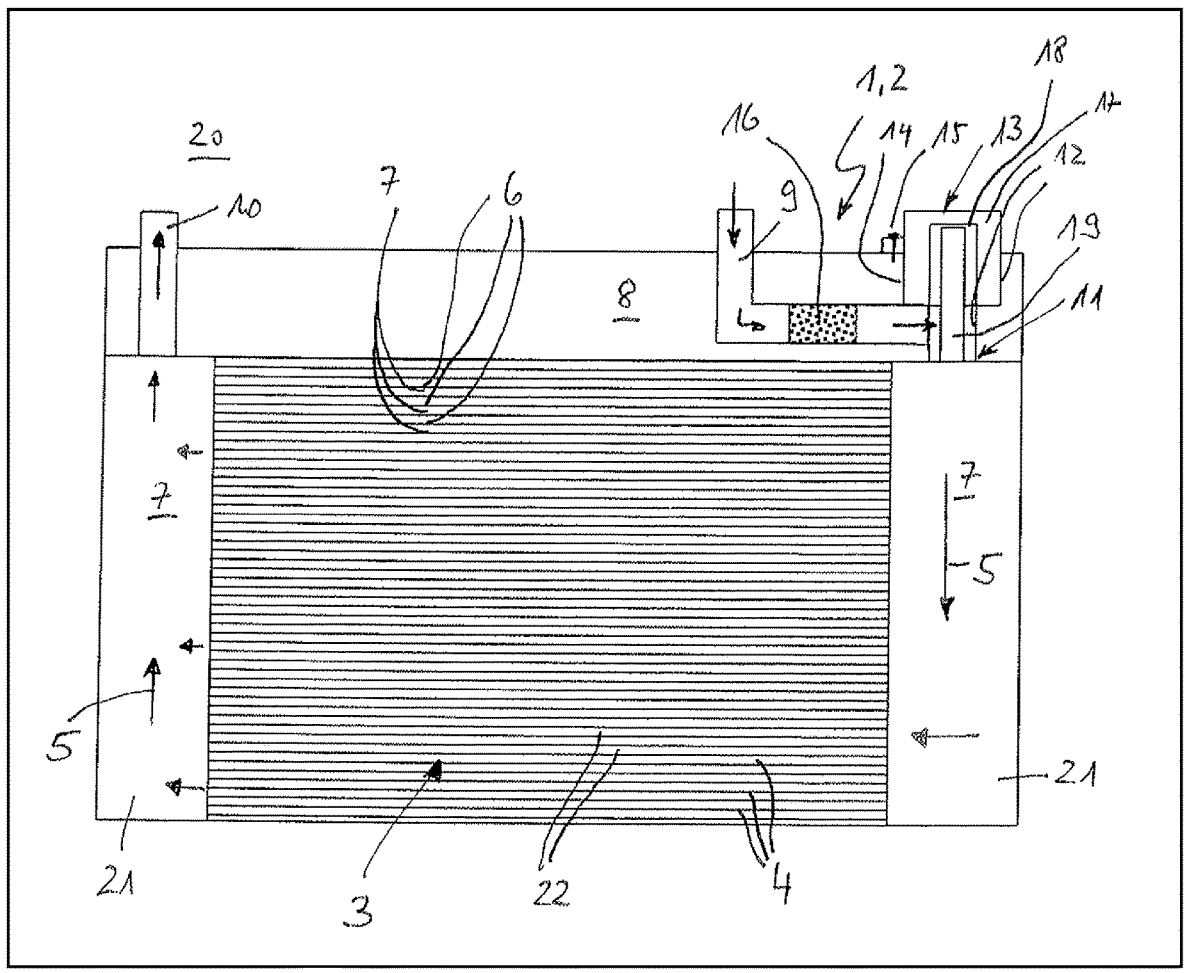

HEAT EXCHANGER OR CHILLER

CROSS-REFERENCE TO RELATED APPLICATIONS

This application claims priority to International Patent Application No. PCT/EP2016/057006, filed on Mar. 31, 2016, and German Patent Application No. 10 2015 205 933.2, filed on Apr. 1, 2015, the contents of both which are incorporated herein by reference in their entireties.

TECHNICAL FILED

The present invention relates to a heat exchanger or a chiller of plate construction, comprising a heat exchanger block, an expansion valve and a connection flange. The invention relates in addition to a motor vehicle equipped with such a heat exchanger or chiller.

BACKGROUND

From DE10,2011/008,653 A1 a generic heat exchanger of plate construction is known, comprising a heat exchanger block with stack plates stacked over one another, wherein between the latter a first fluid channel is formed for a coolant, and a second fluid channel is formed for a refrigerant. Furthermore, a thermostatic expansion valve is provided for controlling a mass flow rate of the refrigerant, and a connection flange with an inlet channel and an outlet channel for the refrigerant, wherein the inlet channel is connected to the second fluid channel of the heat exchanger block in a transition region. In order to be able to reduce an overall height here, a first inlet- or outlet opening is formed by an immersion pipe, wherein through the immersion pipe itself the coolant is able to be introduced into the first fluid channel, so that the first inlet- and outlet opening can be formed on the same side of the heat exchanger.

From DE10,2011/081,886 A1 a further generic heat exchanger is known.

So-called chillers or heat exchangers, by means of which a coolant is cooled with the aid of an evaporating refrigerant, are normally equipped with a thermostatic expansion valve as a structural unit. This expansion valve controls the evaporation process here via a drop in pressure on the refrigerant side, and via the mass flow rate, changing as a result of this, in the evaporator inlet, so that a desired outlet state occurs at the stacked plate heat exchanger. The controlling takes place with the thermostatic expansion valve via the expansion of a refrigerant as a function of the outlet temperature. An influence from the exterior is not possible. The refrigerant flow can be interrupted via a shutoff unit.

Such chillers are used in particular in the field of battery cooling, wherein in these chillers the refrigerant is evaporated which is connected via refrigerant lines to an air conditioning circuit of a motor vehicle. The evaporator in the air conditioning circuit and the described evaporator are connected in parallel here, wherein a distribution of the refrigerant to the two evaporators is controlled through two expansion valves, which respectively sit in flow direction before the actual evaporators.

A disadvantage in the heat exchangers or respectively chillers known from the prior art, however, is that these require comparatively many interfaces and, related thereto, a comparatively great effort with regard to assembly. Furthermore, they take up a large installation space and are expensive. If only one shutoff unit is used, only one on/off function can be realized by it, whereby, however, limits are placed on the controlling.

SUMMARY

The present invention is therefore concerned with the problem of indicating for a heat exchanger or a chiller of the generic type an improved or at least an alternative embodiment, which is distinguished in particular by a smaller space requirement, an exact controlling and reduced costs.

This problem is solved according to the invention by the subject of the independent claims. Advantageous embodiments are the subject of the dependent claims.

The present invention is based on the general idea of providing a connection flange of a heat exchanger or of a chiller with a special insertion opening, into which an electronic expansion valve can be directly inserted, without the mounting of separate lines or of a further flange being necessary for this. The heat exchanger or chiller according to the invention comprises here a heat exchanger block with a first fluid channel for a coolant and with a second fluid channel for a refrigerant. The heat exchanger block can have here for example a plurality of stack plates stacked over one another, wherein between the stacked plates the first fluid channel for the coolant and the second fluid channel for the refrigerant is formed. Alternatively, the heat exchanger block can also be constructed as a flat tube heat exchanger and can consequently have a plurality of flat tubes, in which the second fluid channel for the refrigerant is formed, whereas the first fluid channel for the coolant is formed around the flat tubes. Furthermore, an expansion valve for influencing a mass flow rate of the refrigerant, and a connection flange with an inlet channel and an outlet channel for the refrigerant are provided, wherein the inlet channel is connected to the second fluid channel of the heat exchanger block in a transition region. According to the invention, the expansion valve is now constructed as an electronic expansion valve and thereby enables an extremely accurate and precise controlling of the mass flow rate of the refrigerant, wherein furthermore the connection flange has an insertion opening communicating with the transition region of the inlet valve, into which insertion opening the expansion valve is able to be inserted in such a way that it controls a mass flow rate of the refrigerant in the transition region and evaporation of the refrigerant first occurs in the second fluid channel of the heat exchanger/chiller, i.e. in the heat exchanger block. Compared to previous expansion valves, which had usually enabled only an on/off function, a particularly exact and needs-based controlling of the refrigerant flow can be achieved through the electronic expansion valve. Through the insertion possibility of the electronic expansion valve into the insertion opening arranged on the connection flange, furthermore the flange hitherto provided separately on the expansion valve can be dispensed with, whereby not only the weight of the expansion valve is considerably reduced, but also the effort of installation of the expansion valve on the heat exchanger or respectively chiller. Through the elimination of the flange of the expansion valve and the integration of the expansion valve into the connection flange, the necessary installation space requirement can also be distinctly reduced, which in particular represents a considerable advantage in modern engine compartments. Incidentally, the efficiency of the heat exchanger or respectively chiller according to the invention can also be increased, because through the insertable expansion valve an evaporation of the refrigerant first occurs in the heat exchanger block of the chiller and not already externally or in an external flange, so that the cooling of the hitherto externally arranged components no longer occurs, which is advantageous in that the cooling energy can be used exclusively for cooling the coolant in the heat exchanger block and is not already previously emitted externally. It is thereby achieved that the expansion valve is inserted into the connection flange up to the boundary to the heat exchanger block.

In an advantageous further development of the solution according to the invention, the electronic expansion valve is fastened detachably in the insertion opening, in particular via a bayonet closure or a screwed connection. Particularly such a bayonet closure offers the possibility of a considerably simplified installation and dismantling, wherein the bayonet closure is of course designed so that it is absolutely impervious and thereby an unintentional escaping of refrigerant is reliably prevented. In addition, the bayonet closure can be prevented from an unintentional loosening by means of a security element. Alternatively, a screwed connection is also conceivable, via which the expansion valve, which is inserted into the insertion opening, is fixed to the connection flange.

In an alternative embodiment of the solution according to the invention, the expansion valve is fastened non-detachably in the insertion opening, in particular is connected to the connection flange in a materially bonded or frictionally engaged manner. This again offers the particular advantage that the electronic expansion valve can be fixed comparatively simply but nevertheless imperviously and securely in the insertion opening.

In a further advantageous embodiment of the solution according to the invention, a filter device is provided upstream of the expansion valve. Such a filter device protects the expansion valve from suspended matter which in some circumstances can bring about an impairment to the function of the electronic expansion valve.

In an advantageous further development of the solution according to the invention, the filter device is arranged in the connection flange. In order to be able to achieve a further optimization of installation space, in addition to the electronic expansion valve additionally also the filter device can be arranged in the connection flange, i.e. can be integrated therein.

In a further advantageous embodiment of the solution according to the invention, the expansion valve has a stator, a rotor housing arranged securely therein, and a rotor arranged rotatably in the rotor housing, wherein the stator, the rotor housing and the rotor form a structural unit. Hereby, it is possible to insert the expansion valve in a complete manner, i.e. together with the stator, the rotor housing and the rotor, into the insertion opening on the connection flange, and to mount it there. Hereby, the installation of the electronic expansion valve can be distinctly simplified.

The present invention is further based on the general idea of equipping a motor vehicle with a previously described heat exchanger or chiller. The previously described heat exchanger or respectively chiller can be used in particular for battery cooling, which is of essential importance in so far as the motor vehicle is configured as a hybrid or electric vehicle. Since as optimum a battery temperature as possible must be kept for the full performance development, it must be cooled or heated if applicable, which is possible by means of the heat exchanger or respectively chiller according to the invention.

Further important features and advantages of the invention will emerge from the subclaims, from the drawings and from the associated FIGURE description with the aid of the drawings.

It shall be understood that the features mentioned above and to be explained further below are also able to be used not only in the respectively indicated combination, but also in other combinations or in isolation, without departing from the scope of the present invention.

A preferred example embodiment of the invention is illustrated in the drawings and is explained further in the following description.

BRIEF DESCRIPTION OF THE DRAWING

The single FIGURE shows a sectional illustration through a heat exchanger or chiller according to the invention.

DETAILED DESCRIPTION

According to the FIGURE, a heat exchanger 1 or chiller 2 according to the invention has a heat exchanger block 3, which in the illustrated case is constructed as a flat tube heat exchanger and consequently has a plurality of flat tubes 4, in which a second fluid channel 7 for a refrigerant 5 is formed, whereas a first fluid channel 6 for the coolant is formed around the flat tubes 4. In this case, a collector 21 would be arranged on the right and on the left.

Alternatively, the heat exchanger block 3 can of course also be constructed as a stacked plate heat exchanger with stack plates 22 stacked over one another, between which the first fluid channel 6 for the coolant and the second fluid channel 7 for the refrigerant 5 then runs. Furthermore, a connection flange 8 is provided with an inlet channel 9 and an outlet channel 10 for the refrigerant 5, wherein the inlet channel 9 is connected to the second fluid channel 7 in a transition region 11. According to the invention, the connection flange 8 now has an insertion opening 12 communicating with the transition region 11 of the inlet channel 9, into which insertion opening an electronic expansion valve 13 is inserted in such a far manner that it controls a mass flow rate of the refrigerant 5 in the transition region 11 and thereby first compels an evaporation of the refrigerant 5 in the second fluid channel 7 or respectively in the heat exchanger block 3 of the heat exchanger/chiller 1,2. Through the configuration of the expansion valve as an electronic expansion valve 13, a particularly exact regulating and controlling of the cooling capacity of the heat exchanger 1 or respectively of the chiller 2 can be achieved.

Through the integration of the electronic expansion valve 13 into the insertion opening 12 of the connection flange 8, furthermore the necessary overall height of the heat exchanger 1 or respectively of the chiller 2 can be considerably reduced, likewise a weight, because the flange which was previously to be arranged separately on the expansion valve 13 can now be dispensed with. As can be seen from the FIGURE here, the electronic expansion valve 13 is arranged over approximately two thirds of its height in the connection flange 8 and only protrudes marginally further over the latter. Of course, alternatively a complete integration in the space of the connection flange 8 is also conceivable.

Through the valve function arranged directly at the transition region 11, an undesired evaporation of the refrigerant 5 in the connection flange 8 or even externally thereof can be reliably prevented, whereby the performance of the heat exchanger 1 or respectively of the chiller 2 can likewise be increased, because the cooling caused by the expansion of the refrigerant 5 first develops in the heat exchanger block 3.

The expansion valve 13 can be fastened here detachably in the insertion opening 12, in particular via a bayonet closure 14 or a screwed connection 15. Both possible connections enable here both a simple installation and also a simple dismantling and thereby a distinctly improved ease of repair and maintenance. The expansion valve 13 is connected to the connection flange 8 in a torque-proof manner both via the screwed connection 15 and also via the bayonet closure 14. Alternatively hereto, provision can of course also be made that the expansion valve 13 is fastened non-detachably in the insertion opening 12, in particular is connected to the connection flange 8 in a materially bonded or frictionally engaged manner.

In order to be able to protect the expansion valve 13 from damage, upstream thereof in the inlet channel 9 a filter device 16 can be provided, wherein the latter is also preferably integrated into the installation space of the connection flange 8, but of course can also alternatively be arranged externally to the heat exchanger 1 or respectively to the chiller 2.

Observing the electronic expansion valve 13 according to the invention more closely, it can be seen that this comprises a stator 17, a rotor housing 18 and a rotor 19 arranged rotatably therein, wherein the stator 17, the rotor housing 18 and the rotor 19 preferably form a structural unit, so that the expansion valve 13 can be installed in a complete manner, i.e. with stator 17, rotor housing 18 and rotor 19 into the insertion opening 12 on the connection flange 8.

With the heat exchanger 1 or respectively the chiller 2 according to the invention in particular an improved battery cooling can be achieved, so that these components are preferably used in a motor vehicle 20 which is configured for example as a hybrid vehicle or as an electric vehicle.

With the heat exchanger 1 or respectively chiller 2 according to the invention, the number of interfaces can be reduced, likewise an effort of installation, a necessary installation space volume, the weight and the costs. On the other hand, an increased performance and an improved controllability can be achieved.

The invention claimed is:

1. A heat exchanger or chiller, comprising
   a heat exchanger block having a first fluid channel for a coolant and a second fluid channel for a refrigerant;
   an expansion valve for controlling a mass flow rate of the refrigerant, the expansion valve being designed as an electronic expansion valve;
   a connection flange having an inlet channel and an outlet channel for the refrigerant, wherein the inlet channel is connected to the second fluid channel in a transition region of the inlet channel; and
   a filter device upstream of the expansion valve;
   wherein the connection flange has an insertion opening, which communicates with the transition region of the inlet channel, and into which the expansion valve is inserted such that the expansion valve controls the mass flow rate of the refrigerant in the transition region and evaporation of the refrigerant first occurs in the second fluid channel; and
   wherein the expansion valve is fastened detachably in the insertion opening and protrudes over the connection flange.

2. The heat exchanger or chiller according to claim 1, wherein the filter device is arranged in the connection flange.

3. The heat exchanger or chiller according to claim 1, wherein the expansion valve has a stator, a rotor housing arranged securely within the stator, and a rotor arranged in the rotor housing, wherein the stator, the rotor housing and the rotor form a structural unit.

4. The heat exchanger or chiller according to claim 1, wherein the expansion valve is connected to the connection flange in a torque-proof manner.

5. The heat exchanger or chiller according to claim 1, wherein one of:
   the heat exchanger block is constructed as a flat tube heat exchanger and has a plurality of flat tubes, in which the second fluid channel for the refrigerant is formed, the first fluid channel for the coolant is formed around the flat tubes, and the flat tubes are collected at a longitudinal end side in a collector; or
   the heat exchanger block is constructed as a stacked plate heat exchanger with stack plates stacked over one another, between which the first fluid channel for the coolant and the second fluid channel for the refrigerant run.

6. The heat exchanger or chiller according to claim 1, wherein the expansion valve is fastened detachably in the insertion opening via a bayonet closure.

7. The heat exchanger or chiller according to claim 1, wherein the expansion valve is fastened detachably in the insertion opening via a screwed connection.

8. The heat exchanger or chiller according to claim 1, wherein the expansion valve is arranged over approximately two thirds of its height in the connection flange.

9. A motor vehicle comprising a heat exchanger or chiller including:
   a heat exchanger block having a first fluid channel for a coolant and a second fluid channel for a refrigerant;
   an expansion valve for controlling a mass flow rate of the refrigerant, the expansion valve being designed as an electronic expansion valve;
   a connection flange having an inlet channel and an outlet channel for the refrigerant, wherein the inlet channel is connected to the second fluid channel in a transition region of the inlet channel; and
   a filter device upstream of the expansion valve;
   wherein the connection flange has an insertion opening, which communicates with the transition region of the inlet channel, and into which the expansion valve is inserted such that the expansion valve controls the mass flow rate of the refrigerant in the transition region and evaporation of the refrigerant first occurs in the second fluid channel; and
   wherein the expansion valve is fastened detachably in the insertion opening and protrudes over the connection flange.

10. The motor vehicle according to claim 9, wherein the filter device is arranged in the connection flange.

11. The motor vehicle according to claim 9, wherein the expansion valve has a stator, a rotor housing arranged securely within the stator, and a rotor arranged in the rotor housing, wherein the stator, the rotor housing and the rotor form a structural unit.

12. The motor vehicle according to claim 9, wherein the expansion valve is connected to the connection flange in a torque-proof manner.

13. The motor vehicle according to claim 9, wherein one of:
   the heat exchanger block is constructed as a flat tube heat exchanger and has a plurality of flat tubes, in which the second fluid channel for the refrigerant is formed, the first fluid channel for the coolant is formed around the flat tubes, and the flat tubes are collected at a longitudinal end side in a collector; or the heat exchanger block is constructed as a stacked plate heat exchanger with stack plates stacked over one another, between which the first fluid channel for the coolant and the second fluid channel for the refrigerant run.

14. A heat exchanger or chiller, comprising:

a heat exchanger block having a first fluid channel for a coolant and a second fluid channel for a refrigerant;

an expansion valve for controlling a mass flow rate of the refrigerant, the expansion valve being designed as an electronic expansion valve;

a connection flange having an inlet channel and an outlet channel for the refrigerant, wherein the inlet channel is connected to the second fluid channel in a transition region of the inlet channel;

wherein the connection flange has an insertion opening, which communicates with the transition region of the inlet channel, and into which the expansion valve is inserted such that the expansion valve controls the mass flow rate of the refrigerant in the transition region and evaporation of the refrigerant first occurs in the second fluid channel;

wherein the expansion valve has a stator, a rotor housing arranged securely within the stator, and a rotor arranged in the rotor housing, wherein the stator, the rotor housing and the rotor form a structural unit; and wherein the expansion valve is fastened detachably in the insertion opening.

15. The heat exchanger or chiller according to claim 14, wherein one of:

the heat exchanger block is constructed as a flat tube heat exchanger and has a plurality of flat tubes, in which the second fluid channel for the refrigerant is formed, the first fluid channel for the coolant is formed around the flat tubes, and the flat tubes are collected at a longitudinal end side in a collector; or the heat exchanger block is constructed as a stacked plate heat exchanger with stack plates stacked over one another, between which the first fluid channel for the coolant and the second fluid channel for the refrigerant run.

\* \* \* \* \*